(12) United States Patent
Liu

(10) Patent No.: US 6,484,701 B1
(45) Date of Patent: Nov. 26, 2002

(54) FOUR-STROKE CYCLE INTERNAL COMBUSTION ENGINE

(75) Inventor: Yumin Liu, Tokyo (JP)

(73) Assignee: Kioritz Corporation, Tokyo (JP)

( * ) Notice: Subject to any disclaimer, the term of this patent is extended or adjusted under 35 U.S.C. 154(b) by 28 days.

(21) Appl. No.: 09/717,139

(22) Filed: Nov. 22, 2000

(30) Foreign Application Priority Data

Nov. 25, 1999 (JP) .......................................... 11-333930

(51) Int. Cl.$^7$ .............................................. F02M 31/00
(52) U.S. Cl. ..................... 123/543; 123/547; 123/196 R
(58) Field of Search ................. 123/543–549, 123/557, 196 R, 73 AD

(56) References Cited

U.S. PATENT DOCUMENTS

| | | | |
|---|---|---|---|
| 4,059,086 A | * 11/1977 | Tsubouchi ............... 123/196 R |
| 4,458,642 A | * 7/1984 | Okubo et al. ............... 123/557 |
| 4,721,090 A | 1/1988 | Kato |
| 4,760,833 A | 8/1988 | Tatyrek |
| 4,768,493 A | * 9/1988 | Ohtaka et al. ............... 123/545 |
| 4,862,860 A | 9/1989 | Shinohara |
| 4,962,745 A | 10/1990 | Ohno et al. |
| 5,024,203 A | 6/1991 | Hill |
| 5,347,967 A | 9/1994 | Todero et al. |
| 5,579,735 A | 12/1996 | Todero et al. |
| 5,582,145 A | 12/1996 | Aizawa et al. |
| 5,794,601 A | * 8/1998 | Pantone ....................... 123/557 |
| 5,896,847 A | * 4/1999 | Usuki .......................... 123/557 |
| 6,167,874 B1 | 1/2001 | Becker et al. |

OTHER PUBLICATIONS

Patent Abstracts of Japan, Publication No.: 05222944 Publication Date: Aug. 31, 1993.
Patent Abstracts of Japan, Publication No. 11223116 Publication Date: Aug. 17, 1999.
Inventor: Yumin Liu, "Four–Stroke Cycle Internal Combustion Engine" Filing Date: Sep. 6, 2000, Specifications and Drawings for Application Serial No. 09/655,877.
Patent Abstracts of Japan, Publication No. 11223116, Date of publication of application Aug. 17, 1999.
Patent Abstracts of Japan, Publication No. 05222944, Date of publication of application Aug. 31, 1993.

* cited by examiner

Primary Examiner—Marguerite McMahon
(74) Attorney, Agent, or Firm—Nixon Peabody LLP; Donald R. Studebaker

(57) ABSTRACT

In a compression stroke and an exhaust stroke, a part of a mixture in a downstream intake passage 30b is introduced through a branch intake passage 50a into a crank chamber 20. The mixture introduced into the crank chamber 20 flows into a valve chamber 16 during the expansion stroke and the intake stroke. From which it flows back to an intake port 9 through a circulation passage 71, and is eventually charged into a combustion chamber 7 during the intake stroke. As the mixture passes through a first communicating passage 55 which allows fluid communication between the crank chamber 20 and the valve chamber 16, a gasoline component which is vaporized with comparative easy is vaporized by a heat released from a cylinder block 3 so that the mixture is separated into the lubricating oil and gasoline components.

4 Claims, 10 Drawing Sheets

FOUR-STROKE CYCLE INTERNAL COMBUSTION ENGINE

BACKGROUND OF THE INVENTION

The present invention generally relates to a four-stroke cycle internal combustion engine using a mixed fuel with a lubricant added thereto, and more particularly to a four-stroke cycle internal combustion engine suitable for use in a power source of compact power working machines such as a portable trimmer, a lawn mower, a chain saw, or the like.

DESCRIPTION OF THE PRIOR ART

A portable working machine represented by a trimmer and a chain saw is required to allow an operator to work without any restriction on his working position or posture. Thus, an internal combustion engine or a power source which is mounted on such a working machine is required to maintain stable operation even if it is used, for example, in a laterally tilted position.

In order to comply with such a requirement stated heretofore, there has been generally utilized a compact air-cooled two-stroke cycle gasoline engine (hereinafter referred to as "two-stroke cycle engine") which uses mixed fuel of fuel and lubricating oil mixed with each other at a certain ratio. However, since the two-stroke cycle engine generally produces exhaust gas containing much unburnt gas due to a gas-flow type scavenging system employed therein, it has a disadvantage in that it is difficult to take effective measures to control exhaust gas or emission.

From the standpoint of emission control, a four-stroke cycle internal combustion engine (Otto engine) has the advantage of producing exhaust gas containing a small amount of unburnt gas, whereby it is desirable for the four-stroke cycle internal combustion engine to be employed in the portable working machine in place of the two-stroke cycle engine. In the four-stroke cycle engine, typically, an oil reservoir is disposed in a bottom section of a crankcase in which a crankshaft is accommodated. The oil in the oil reservoir is drawn by a pump and/or is splashed by a rotating member to lubricate an inner surface of a cylinder and a valve system. However, this likely results in a complicated structure and an increased weight due to an additional mechanism for oil delivery and recovery, which is undesirable for the portable working machine.

An existence of the oil reservoir forces the operator to keep the engine in a specified position (generally to keep the cylinder in an upright position) in use, which makes it difficult to apply a typical four-stroke cycle engine to the portable working machine without a modification. Further, there is a possibility of engine seizure due to an unstable or insufficient lubricating oil supply caused by a change in a position or posture thereof. This may interfere with an operational convenience as a portable working machine. Conventionally, various proposals have been submitted in order to improve such problem, one of which is to use mixed fuel of fuel and lubricating oil in the four-stroke cycle engine as in the two-stroke cycle engine.

In the four-stroke cycle internal combustion engine using the mixed fuel, as disclosed in, for example, Japanese Patent Laid-Open Disclosure Nos. Hei 5-222944 and Hei 7-150920, U.S. Pat. Nos. 5,347,967 and 5,579,735, an intake system device including a carburetor is directly connected to a crankcase defining a crank chamber. A mist-like mixed fuel which includes a lubricating oil and which is introduced through the intake system device into the crankcase lubricates an inner surface of a cylinder and rotating members in the crank chamber. It is then introduced into a cylinder head through a communicating passage which connects the crankcase and a cylinder head and lubricates a valve mechanism of intake and exhaust valves in the cylinder head. It is further introduced into a combustion chamber through an intake port.

Employment of the four-stroke cycle internal combustion engine using the mixed fuel allows elimination of the oil reservoir in the bottom section of the crank chamber, an independent oil supply device (a pump or a member to splash the lubrication oil) and also an oil recovery device. Therefore, it provides several advantages that, for example, the stable operation of the engine can be obtained even if it is used in various positions or postures. It further provides advantageous features of lightweight and simple structure for the engine to be used for the portable working machine.

Another type of four-stroke cycle internal combustion engine using the mixed fuel is also disclosed in Japanese Patent Laid-Open Disclosure No. Hei 11-223116. This publication discloses an invention related to an OHV type engine, wherein a mixed fuel including a lubricating oil is introduced into a crankcase through a branch intake passage branched from an intake passage to lubricate inner surfaces of a cylinder and rotating members in a crank chamber, and is then led from the crankcase to a cylinder head through a space for a push rod of an OHV mechanism to lubricate a valve mechanism in the cylinder head. It is then returned to the intake passage.

In the four-stroke cycle internal combustion engine whose inside is lubricated by using a mixed fuel including a lubricating oil, the negative effect upon emission gas caused by the introduced lubricating oil is not negligible since much lubricating oil is introduced into the combustion chamber with a fuel. In addition, there is a possibility of deteriorating engine performances due to the deposit on valve seats of intake and exhaust valves and/or a spark plug resulting from the lubricating oil which is exposed to a high temperature in the combustion chamber.

SUMMARY OF THE INVENTION

The present invention is directed to a four-stroke cycle internal combustion engine using a mixed fuel including lubricating oil, and intends to provide a four-stroke cycle internal combustion engine capable of reducing the amount of lubricating oil which is to be introduced into a combustion chamber with a fuel.

According to the present invention, the above object can be achieved by providing a four-stroke cycle internal combustion engine whose inside is lubricated using a mixed fuel with a lubricant added thereto, said four-stroke cycle internal combustion engine comprising: a combustion chamber; and a path extending from a point at which said mixed fuel is introduced into said engine to a point before charging said mixed fuel into said combustion chamber, whereby a fuel component included in said mixed fuel is vaporized by heating it in said path utilizing heat released from said engine.

Thus, according to the present invention, since the mixed fuel including a lubricating oil is heated by the heat released from the engine, the fuel component in the mixed fuel is vaporized and separated from the lubrication oil before the mixed fuel is introduced into the combustion chamber. It allows the lubrication oil to stay within the engine without discharging is therefrom to outside. In other word, by vaporizing the fuel component in the mixed fuel in the passage introducing it into the combustion chamber, the amount of lubrication oil which is to be included in the mixed fuel introduced into the combustion chamber may be considerably reduced.

In a specific embodiment of the present invention, a first communicating passage which allows fluid communication between a crank chamber accommodating a crankshaft and a valve chamber provided in a cylinder head may be formed in a cylinder block to vaporize the fuel component included in the mixed fuel by heating the mixed fuel passing through the first communicating passage. As is known, the crank chamber requires larger amounts of lubricating oil as compared to the valve chamber in the cylinder head. From this point, it is reasonable to vaporize the fuel component by heating the mixed fuel with the heat released from the cylinder block during the movement of the mixed fuel from the crank chamber to the valve chamber.

Preferably, a second communicating passage which allows fluid communication between the valve camber and the crank chamber is provided to return the lubrication oil in the valve chamber to the crank chamber, so that the amount of lubrication oil in the crank chamber may be maintained in rich condition.

The present invention may be applied to a certain type of engine in which an intake system device is directly connected to a crankcase as disclosed in Japanese Patent Laid-Open Disclosure No. Hei 5-222944 described above. It may be also applied to another type of engine in which a mixed fuel including a lubrication oil is introduced to a crankcase through a branch intake passage branched from an intake passage as disclosed in Japanese Patent Laid-Open Disclosure No. Hei 11-223116 described above.

As for engine types, the present invention may be applied not only to OHC type engines but also to OHV type engines. In the case of the OHV type engines, a hole through which a push rod forming a part of a valve mechanism is passed may be used as the communicating passage for introducing the mixed fuel from the crank chamber to the valve chamber of the cylinder head, wherein the hole may be formed in a cylinder block to vaporize the fuel component by heating the mixed fuel during the movement of the fixed fuel from the crank chamber to the valve chamber.

Other objects and operational advantages of the present invention shall be apparent from the following description of the preferred embodiment.

DESCRIPTION OF THE PREFERRED EMBODIMENT

Referring to the accompanying drawings, preferred embodiments of the present invention will be described in detail.

A First Embodiment (FIGS. 1 to 4)

FIGS. 1 to 4 show a first embodiment of an air-cooling type single cylinder four-stroke cycle internal combustion engine in accordance with the present invention.

Figure 1:
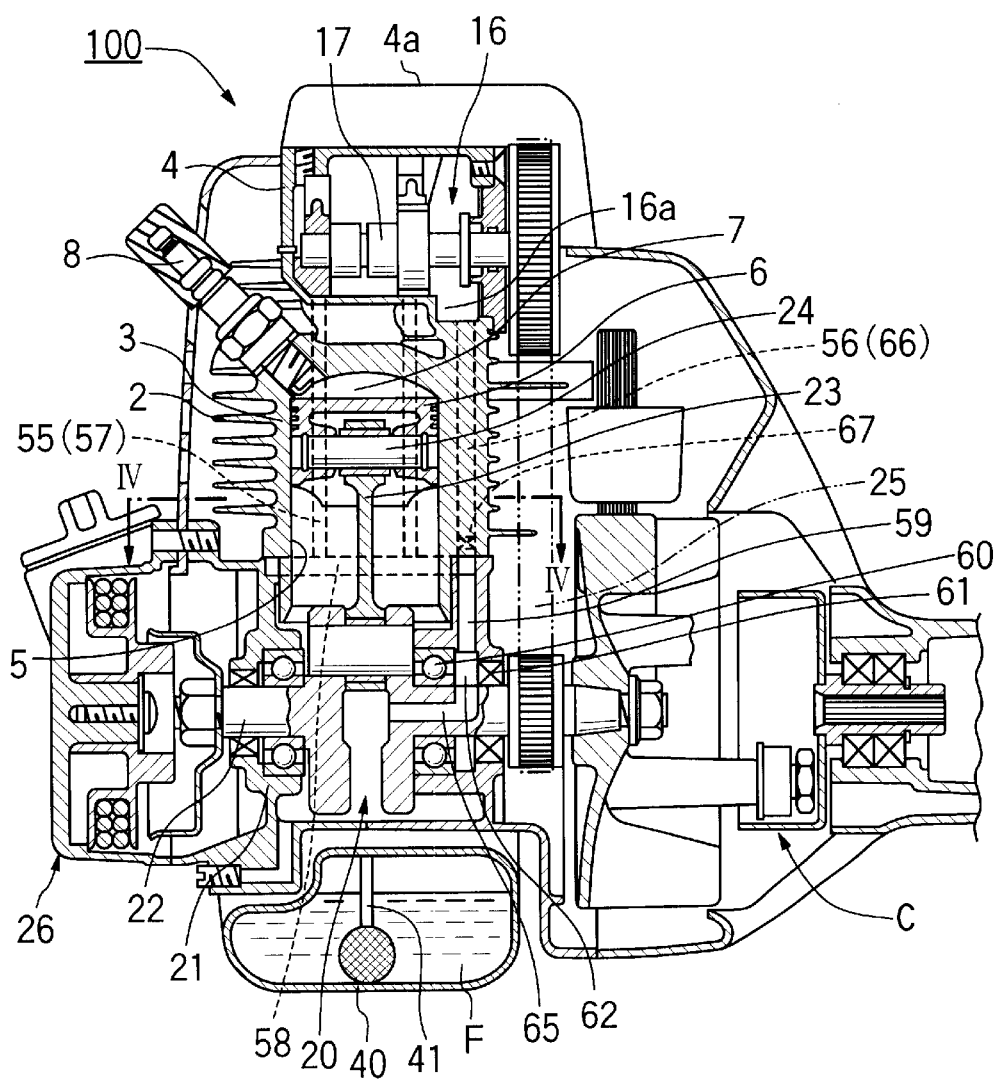
FIG. 1 is a longitudinal cross-sectional view showing an engine of a first embodiment of the present invention, taken along an axis of a crankshaft.
Figure 2:
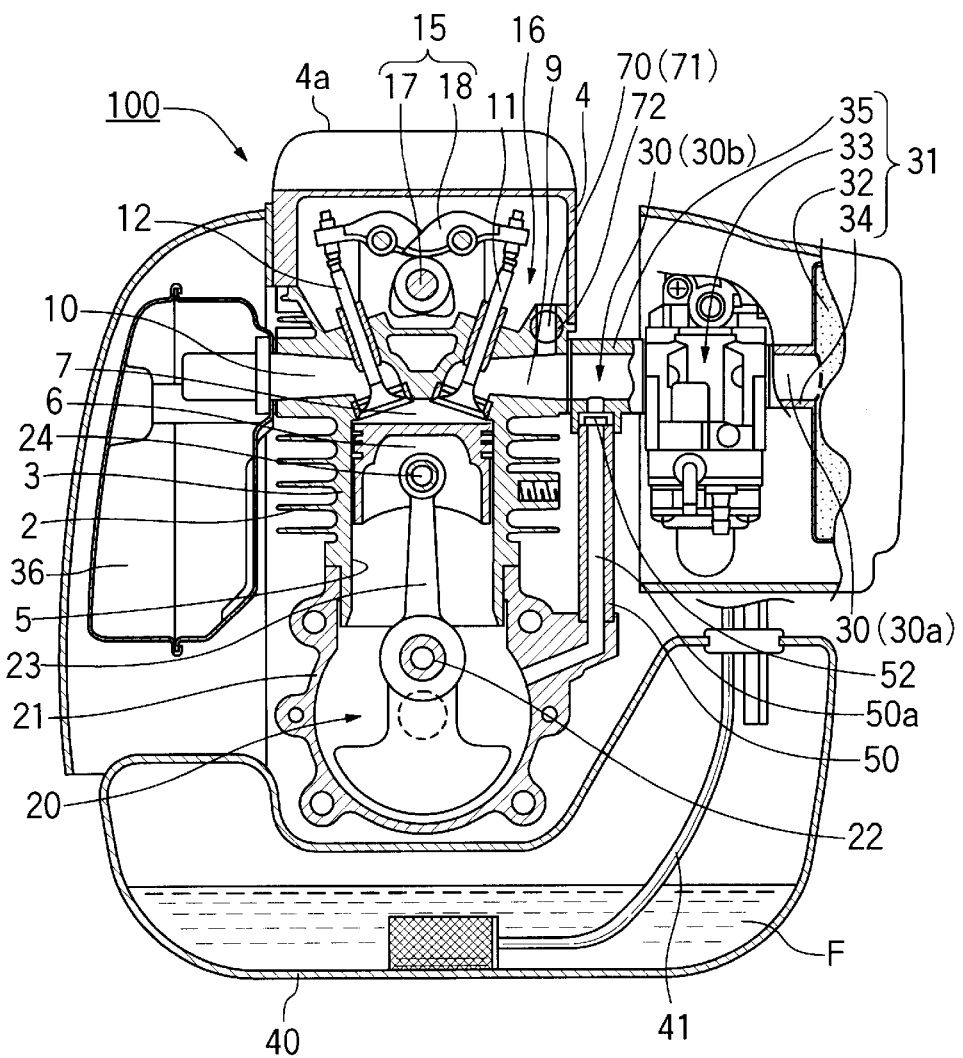
FIG. 2 is a longitudinal cross-sectional view showing the engine of FIG. 1, taken in the cross direction of the crankshaft.
Figure 3:
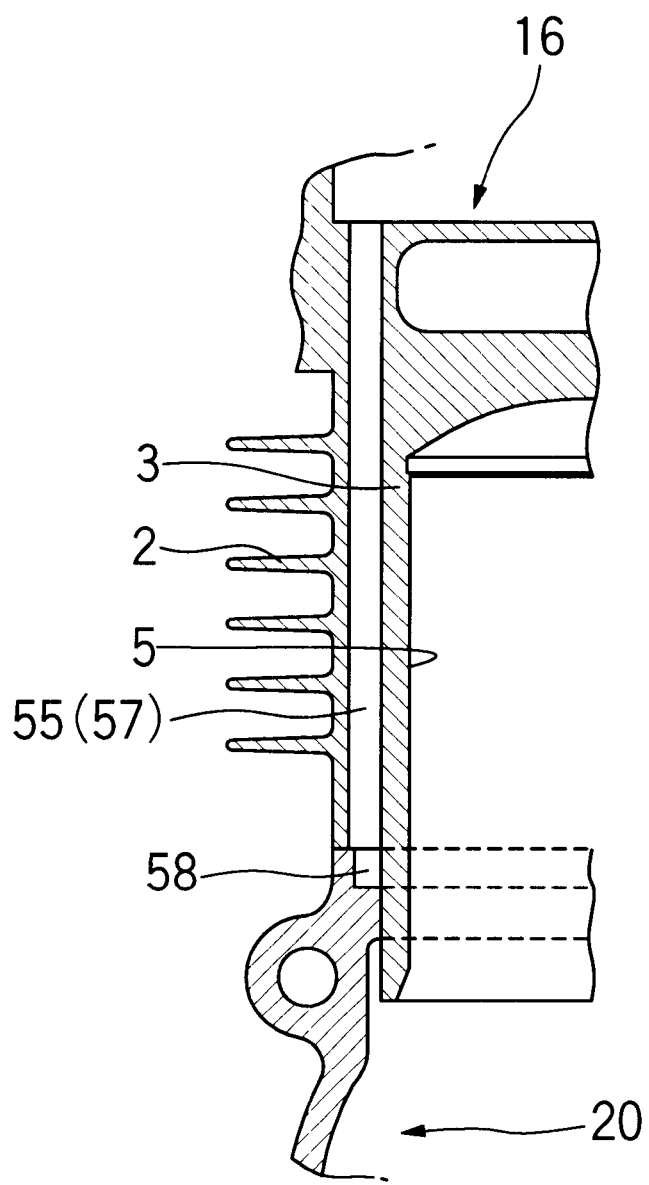
FIG. 3 is an enlarged fragmentary cross-sectional view showing the engine, in which a part of a cylinder block included in the engine shown in FIG. 1 is extracted.

The engine 100 shown in FIGS. 1 and 2 has relatively small displacement of about 20 to 60 milliliter, which illustrates a configuration designed as a power source for a portable trimmer. The engine 100 comprises a cylinder block 3 having cooling fins 2 and a cylinder head 4 integrally fixed onto said cylinder block 3, wherein a combustion chamber 7 is formed between a piston 6 which is vertically slidably inserted into a cylinder bore 5 of the cylinder block 3 and the cylinder head 4.

The cylinder head 4 comprises a spark plug 8 (FIG. 1) disposed facing the combustion chamber 7. It further comprises an intake port 9 and an exhaust port 10 (FIG. 2), each of which opens toward the combustion chamber 7, wherein the intake port 9 and the exhaust port 10 are opened and closed by an intake valve 11 or an exhaust valve 12, respectively.

Further, in the engine 100 shown in the drawings, a valve chamber 16 for arranging a valve mechanism 15 therein is defined by the cylinder head 4 and the head cover 4a mounted thereon. As is conventionally known, the valve mechanism 15 includes a camshaft 17, a rocker arm 18 (FIG. 2), and the like. That is, the engine 100 is a so-called OHC type engine. The valve mechanism 15 includes a valve spring for biasing the rocker arm 18 in a closing direction of the intake valve 11 and the exhaust valve 12 which are, among others, the main components of the valve mechanism 15. However, the spring is omitted to avoid complexity in the drawings.

A crankcase 21 is attached to a bottom of the cylinder block 3 for defining a closed crank chamber 20, and a crank shaft 22 disposed in the crank chamber 20 as an engine output shaft is connected to the piston 6 through a connecting rod 23 and a piston pin 24. The crankshaft 22 is operatively connected to the camshaft 17 through a timing belt 25 (FIG. 1), and whereby the intake valve 11 and the exhaust valve 12 are opened and closed in a specified timing in sync with a rotation of the crankshaft 22.

In FIG. 1, the reference numeral 26 indicates a recoil starter, which is operationally connected to the crankshaft 22. When the engine 100 is to be started, the recoil starter 26 is used to manually start the engine 100. A centrifugal clutch C outputs a rotational driving force of the crankshaft 22 to a trimming device (not shown).

An intake system device 31 is connected to the intake port 9, as shown in FIG. 2, for forming an intake passage 30 communicating with the intake port 9. The intake system device 31 comprises an air cleaner 32, a diaphragm type carburetor 33 or a fuel supply means including a throttle valve (not shown), an upstream intake pipe 34 defining an upstream intake passage 30a located in an upstream side of the carburetor 33 by connecting the air cleaner 32 to the carburetor 33, and a downstream intake pipe 35 defining a downstream intake passage 30b located in a downstream side of the carburetor 33 by connecting the carburetor 33 to the intake port 9. In addition, a muffler 36 is connected to the exhaust port 10 as an exhaust system device.

A fuel tank 40 is disposed under the engine 100 adjacent to the crankcase 21 for reserving a mixed fuel F composed of gasoline as a fuel and lubricating oil added thereto. The mixed fuel F in the fuel tank 40 is supplied through a pipe 41 to the carburetor 33 to be atomized thereby and discharged into the downstream intake passage 30b therefrom.

Further, the engine 100 has an external pipe 50 (FIG. 2) connecting the downstream intake pipe 35 to the crankcase 21 to allow fluid communication between the downstream intake passage 30b and the crank chamber 20. That is, a branch intake passage 50a branched from the downstream intake passage 30b is formed by the external pipe 50, whereby an air-fuel mixture or a mixture including a lubricating oil passing through the downstream intake passage 30b is introduced into the crank chamber 20. A suitable type of a first check valve 52 is interposed at a connecting portion of the downstream intake pipe 35 and the external pipe 50. The first check valve 52 allows a fluid flow from the downstream intake passage 30b to the crank chamber 20, but prohibits the fluid flow in the reverse direction. The first check valve 52 may be disposed at any position in the passage which allows fluid communication between the downstream intake passage 30b and the crank chamber 20, such as a connecting portion of the external pipe 50 and the crankcase 21.

The engine 100 also includes first and second communicating passages 55 and 56 (FIG. 1). Each of the first and second communicating passages 55 and 56 is connected to both the crank chamber 20 and the valve chamber 16 for allowing fluid communication therebetween. The first communicating passage 55 is formed of a first through hole 57 whose major part vertically passes through the wall of cylinder block 3 and which is located adjacently to the cylinder bore 5.

Figure 4:
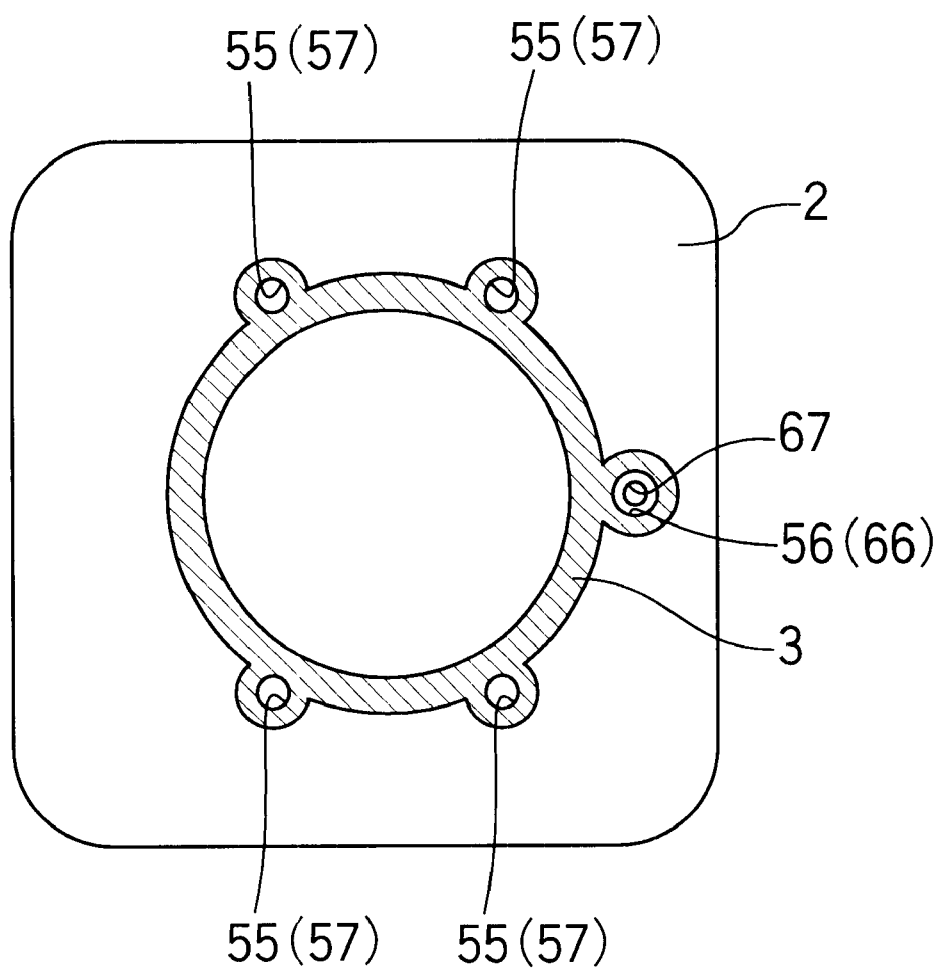
FIG. 4 is a cross-sectional view taken along the line IV—IV of FIG. 1.

The first through hole 57 may be, but is not limited to, four through holes spaced apart from each other in the circumferential direction of the cylinder block 3 (FIG. 4). A lower edge of the first through hole 57 is connected to a gallery 58 which is formed in an upper face of the crankcase 21 and continuously extends in the circumferential direction. The gallery 58 is in fluid communication with a space 62 provided between a bearing 60 adjoining the crankshaft 22 and an oil seal 61 via a case inner passage 59 formed in a sidewall of the crankcase 21, and the space 62 is in fluid communication with the crank chamber 20 via a shaft inner passage 65 extending along an axis of the crankshaft 22 (FIG. 1).

The second communication passage 56 has an upper end which opens at a depression 16a formed in a bottom wall of the valve chamber 16 (FIG. 1). The second communication passage 56 is formed of one through hole 66 which vertically passes through the cylinder block 3. The through hole 66 extends via a suitable type of a second check valve 67 and a lower end of the through hole 66 is provided at a position out of the case inner passage 59 to allow the through hole 66 to be opened to the crank chamber 20 (FIG. 1). The second check valve 67 is provided for allowing a fluid flow from the valve chamber 16 to the crank chamber 20 and for prohibiting the fluid flow in the reverse direction so as to more reliably maintain a circulation of the fluid, but the second check valve 67 may be omitted in some cases.

The cylinder head 4 includes a through hole 70 which allows fluid communication between the intake port 9 and the valve chamber 16. The through hole 70 defines a circulation passage 71 for circulating a mixture composed of the mixed fuel and air in the valve chamber 16 to the intake port 9. For example, a manual rotary valve 72 is attached in the circulation passage 71. Since the circulation passage 71 is simply provided for allowing fluid communication between the valve chamber 16 and the intake passage 30, the circulation passage 71 may, for example, be provided between the valve chamber 16 and the downstream intake tube 35, or between the valve chamber 16 and the upstream intake tube 34. The manual valve 72 is operated to close the circulation passage 71 when the engine 100 is to be started, and is kept in an open state after the engine 100 is started. The valve 72 is not necessarily indispensable but may be omitted in some cases.

The engine 100 having the above construction performs the following operations in a series of intake stroke through exhaust stroke.

(1) Intake Stroke

In an intake stroke, the exhaust valve 12 is closed, while the intake valve 11 is opened. Since the piston 6 is moved downward under this condition, the mixture is introduced into the combustion chamber 7 through the intake passage 30. In the intake stroke, the crank chamber 20 is led into a positive pressure (pressurized condition) as the piston 6 is moved downward.

Thus, the first check valve 52 which opens/closes the branch intake passage 50a is kept in a closed state and whereby the mixture is not introduced from the downstream intake passage 30b into the crank chamber 20 during the intake stroke. On the other hand, the mixture in the crank chamber 20 is pushed out into the first cylinder block inner communicating passage 55 by the downward movement of the piston 6 and flows through the first communicating passage 55 into the valve chamber 16 to lubricate the valve mechanism 15 and the like in the valve chamber 16. In the intake stroke, the second cylinder block inner communication passage 56 is kept in a closed state by the second check valve 67.

(2) Compression Stroke

When the engine 100 enters into a compression stroke, both the intake valve 11 and the exhaust valve 12 are closed. Under this condition, the piston 6 is moved upward to compress the mixture in the combustion chamber 7. In the compression stroke, the crank chamber 20 is led into a negative pressure (depressurized condition) as the piston 6 is moved upward. Accordingly, the first check valve 52 in the branch intake passage 50a is kept in an open state, whereby a part of the mixture in the downstream intake passage 30b is introduced into the crank chamber 20 through the branch intake passage 50a (3) Expansion stroke Then, the mixture in the combustion chamber 7 is ignited by the spark plug 8, and the engine 100 enters into the expansion stroke. In the expansion stroke, both the intake valve 11 and the exhaust valve 12 are closed. Under this condition, the piston 6 is moved downward. In the expansion stroke, the crank chamber 20 is led into a positive pressure as the piston 6 is moved downward.

Thus, the first check valve 52 in the branch intake passage 50*a* is kept in the closed state, whereby the mixture is not introduced from the downstream intake passage 30*b* into the crank chamber 20 during the expansion stroke. On the other hand, the mixture in the crank chamber 20 is pushed out into the first cylinder block inner communication passage 55 through the shaft inner passage 65, the space 62, the case inner passage 59 and the gallery 58 by the downward movement of the piston 6, and flows through the block inner passage 55 into the valve chamber 16.

(4) Exhaust Stroke

In an exhaust stroke, the intake valve 11 is in the closed state, while the exhaust valve 12 is in the open state. Under this condition, the piston 6 is moved upward, whereby a combustion gas in the combustion chamber 7 is exhausted through the exhaust port 10 and the muffler 36 to outside. In the exhaust stroke, the crank chamber 20 is led into a negative pressure as the piston 6 is moved upward. Thus, the check valve 52 is opened whereby the mixture in the downstream intake passage 30*b* is introduced into the crank chamber 20 through the branch intake passage 50*a*.

Upon completing the exhaust stroke, the engine 100 returns to the intake stroke described above, and then repeats the compression stroke, the expansion stroke and the exhaust stroke in this order. When the engine 100 moves from the exhaust stroke into the intake stroke, the mixture in the valve chamber 16 flows through the through hole 70 in the cylinder head 4 into the intake port 9 and then is introduced into the combustion chamber 7.

(5) Engine Start

When the engine 100 is to be started, an operator operates the valve 72 to close the circulation passage 71 for blocking fluid communication between the valve chamber 16 and the intake port 9 (That is, to close the valve 72.) Thus, the mixture is introduced into the combustion chamber 7 only through the intake system device 31. This may prevent deterioration of the engine starting performance due to changed air-fuel ratio of the mixture in the intake port 9 which results from causing the mixture to flow via the valve chamber 16 into the intake port 9 during the engine start.

According to the engine 100 of the first embodiment described above, in the compression stroke and the exhaust stroke, a part of the mixture in the downstream intake passage 30*b* is introduced through the branch intake passage 50*a* into the crank chamber 20. Then, the mixture introduced into the crankcase 20 flows into the valve chamber 16 during the expansion stroke and the intake stroke. From which it flows back to the intake port 9 through the circulation passage 71, and is eventually charged into the combustion chamber 7 during the intake stroke.

Since the mixture introduced into the crank chamber 20 and the valve chamber 16 during a series of strokes is contains lubricating oil, as described above, the lubricating oil in the mixture may provides necessary lubrication for the engine internals. Thus, an oil reservoir, which is generally indispensable to the conventional four-stroke cycle internal combustion engine, is not necessary and, consequently, there is no possibility of unstable operation of the engine 100 due to insufficient lubrication even when, for example, the trimmer (not shown) equipped with the engine 100 is excessively tilted clockwise or counter-clockwise during operation thereof.

Further, since the engine 100 employs a construction in which the intake system device 31 is connected, as in the conventional four-stroke cycle internal combustion engine, to the intake port 9 opening to the combustion chamber 7, the basic layout of the conventional four-stroke cycle internal combustion engine can be applied to the design of the engine 100 without a modification. Consequently, a practical benefit, such as a reduction in development costs, necessary for engine design may be provided.

In addition, since this construction allows the mixture to be supplied to the inlet port 9 which opens to the combustion chamber 7 through the intake system device 31 directly communicating therewith, the same degree of response performance can be obtained with as the conventional four-stroke cycle internal combustion engine in which the intake system is coupled with the intake port. That is, an improved response performance can be provided compared with the conventional four-stroke cycle internal combustion engine in which the intake system component is directly coupled with the crankcase to be lubricated by the mixed fuel.

Further, the engine 100 is adapted to allow the mixture to be led from the crank chamber 20 to the valve chamber 16 through the first communication passage 55 formed in the cylinder block 3. Thus, the mixture which includes lubricating oil after lubricating related members in the crank chamber 20 is heated by the heat released from the cylinder block 3 and whereby a gasoline component in the mixture is vaporized.

That is, as to the mixture which is passing through the first communicating passage 55, the gasoline component which is vaporized with comparative ease is vaporized by the heat of the cylinder block 3 so that the mixture is separated into the lubricating oil component and the gasoline component. Thus, the lubricating oil component tends to attach, for example, on an inner wall of the first communicating passage 55, and the lubricating oil on the inner wall flows down along the inner wall and returns to the crank chamber 20 through the gallery 58 and the shaft inner passage 65.

As to the mixture which enters into the valve chamber 16, the gasoline component is maintained in a vaporized state by virtue of heat furnished by the periphery of the exhaust port 10. Thus, the lubricating oil component of the mixture may be enhanced in the rate of attaching to each slide surface of the valve mechanism 15 and the like and may effectively contribute to lubricating them. In addition, the lubricating oil attached on an inner wall surface of the valve chamber 16 flows down to the crank chamber 20 through the depression 16*a* of the valve chamber 16 and the second communication passage 56. Thus, the crank chamber 20, having a large requirement in the amount of lubrication oil, may be maintained in a sufficiently full condition. That is, by introducing the lubrication oil stored in the valve chamber 16 into the crank chamber 20, the amount of lubrication oil in the crank chamber 20 may be sufficiently enriched.

In the case where a relatively large amount of lubricating oil is stagnant in the crank chamber 20, a splash member may, for example, be provided in 10 the crankshaft 22 which splashes the lubricating oil stored in the crank chamber 20 to assist lubrication of the crank chamber 20 and an inner wall of the cylinder bore 5.

Since the mixture is heated in the first communicating passage 55 formed in the cylinder block 3 as the mixture moves from the crank chamber 20 to the valve chamber 16 and then is introduced into the valve chamber 16 after vaporizing the gasoline component of the mixture, the lubricating oil which is included in the mixture entering in the valve chamber 16 is relatively leaner than that of the mixture in the crank chamber 20. However, the valve chamber 16 requires a smaller amount of lubricating oil in comparison with the crank chamber 20. Therefore, the valve chamber 16 can be lubricated without any problem even if the lubricating oil component of the mixture which is introduced into the valve chamber 16 after it is heated in the first communicating passage 55 is relatively leaner than that of the mixture of the crank chamber 20.

As to the mixture in the valve chamber 16, since the gasoline component in a vaporized state is maintained by virtue of the heat released from the cylinder block 3, the lubricating oil component is more easily attached to the valve mechanism 15 having need of lubrication than the gasoline component in the vaporized state, which enables the valve mechanism 15 to be efficiently lubricated.

Thus, the mixture going out of the valve chamber 16 after passing through the valve chamber 16 includes a significantly reduced amount of lubricating oil component. That is, the amount of lubricating oil included in the mixture which is to be introduced from the valve chamber 16 into the combustion chamber 7 through the intake port 9 shall be reduced. While the engine 100 of the first embodiment has been described with an example of an OHC type engine, the present invention may be similarly applied to OHV type engines.

Figure 5:
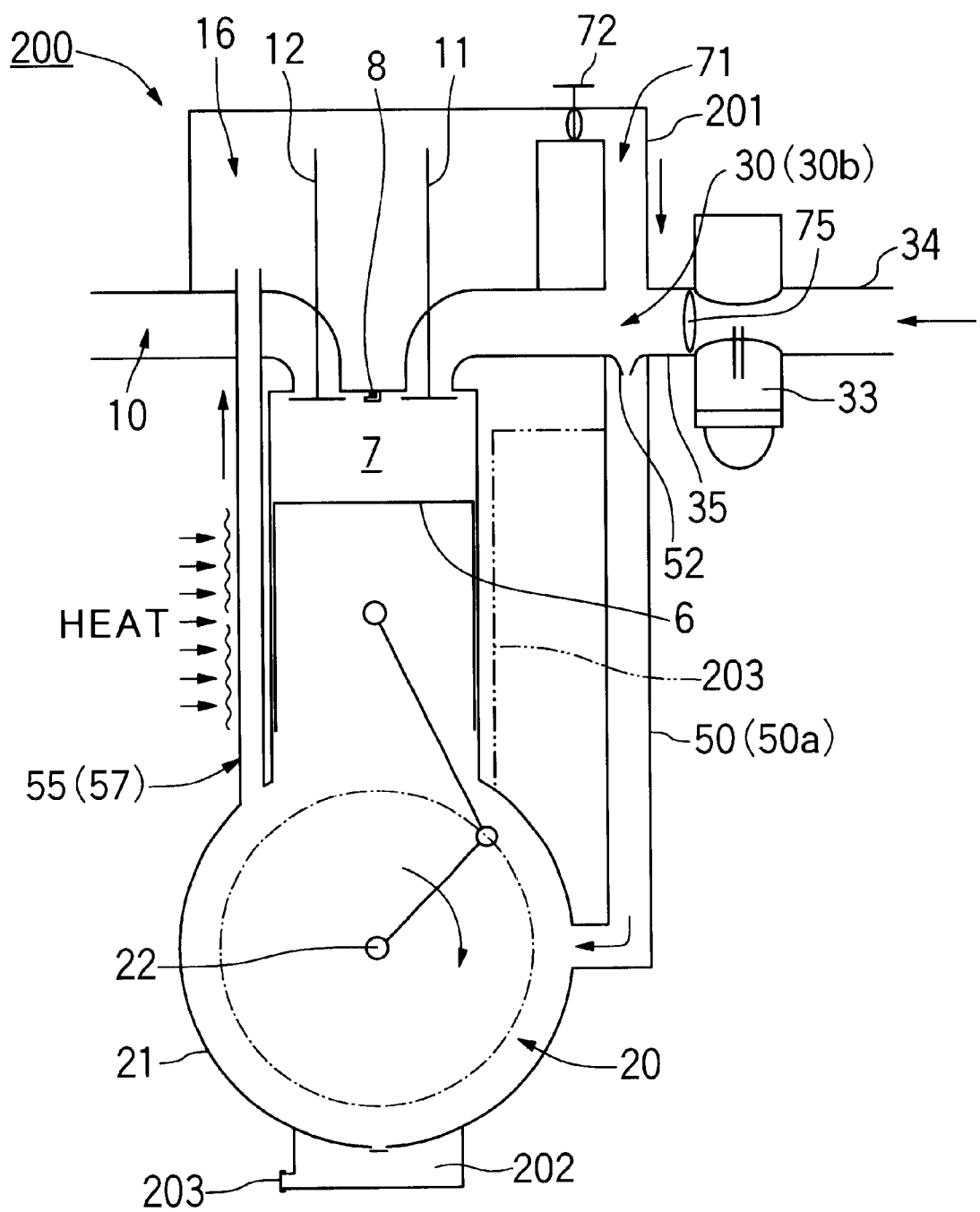
FIG. 5 is a schematic block diagram showing an engine of a second embodiment of the present invention.

FIG. 5 and figures thereafter show other embodiments of the present invention, in which their description shall be omitted by indicating the same or corresponding components by the same reference numerals. Features of the embodiments shown in such figures shall be described hereinafter.

Second Embodiment (FIG. 5)

The engine 200 of the second embodiment includes a second external pipe 201 connected to the cylinder head 4 and the downstream intake pipe 35 so as to form the circulation passage 71. A relatively small lubricating oil reserve chamber 202 is formed in a bottom portion of the crankcase 21. The lubricating oil staying in the lubrication oil reserve chamber 202 is periodically discharged by detaching a cap 203. The reference number 75 in FIG. 5 indicates a throttle valve.

The engine 200 of the second embodiment and/or the engine 100 of the first embodiment may be provided with a second branch passage 203 (shown by two-dotted lines in FIG. 5) branched from the branch intake passage 50a, and the second branch passage 203 may be passed through the cylinder block 3 and then opened to the crank chamber 20. Thus, a part of the mixture passing through the branch intake passage 50a may be heated by the heat released from the cylinder block 3 so as to vaporize the gasoline component contained in the mixture.

Figure 6:
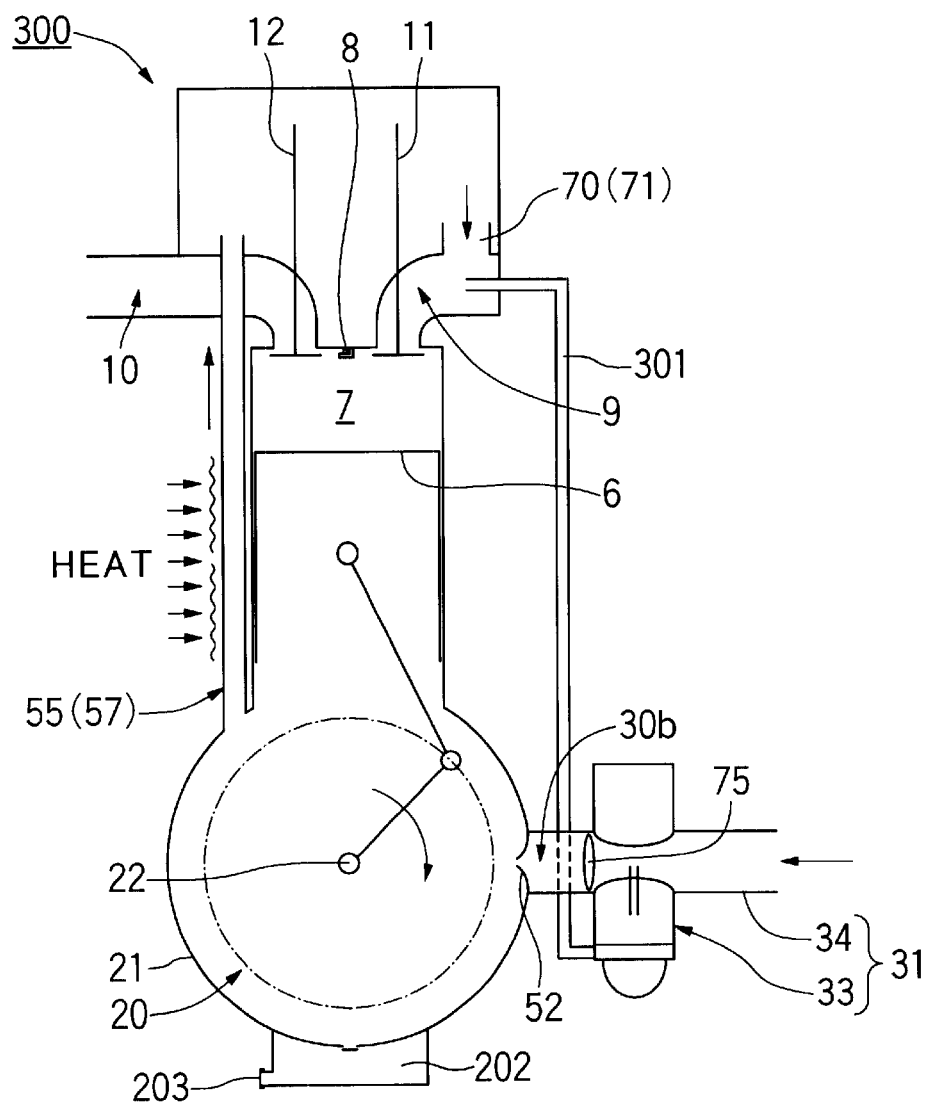
FIG. 6 is a schematic block diagram showing an engine of a third embodiment of the present invention.

Third Embodiment (FIG. 6)

In the engine 300 of the third embodiment, the intake system device 31 is coupled to the crankcase 21, and the downstream intake passage 30b is directly in fluid communication with the crank chamber 20. Thus, in the engine 300, the entire amount of mixture which is generated in the intake system device 31 and which includes lubricating oil is introduced into the crank chamber 20.

One end of an external fuel supply pipe 301 is connected to an engine start fuel supply pump (not shown) included in the intake system device 31, and another end of the external fuel supply pipe 301 is connected to the intake port 9. When the engine 300 is to be started, excess fuel is directly supplied to the intake port 9 through the external fuel supply pipe 301.

Figure 7:
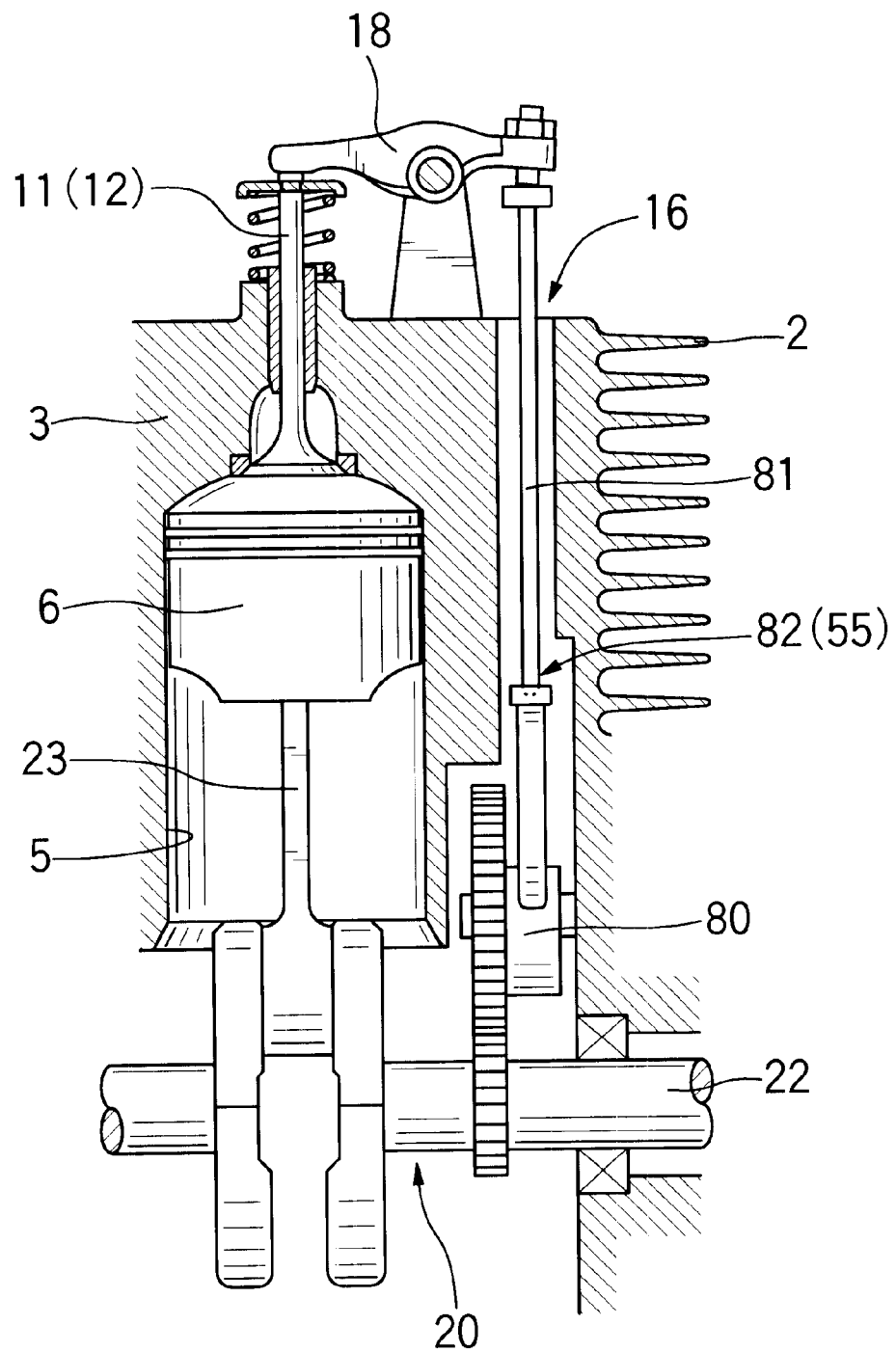
FIG. 7 is a schematic cross-sectional view illustrating a construction for connecting a crank chamber to a valve chamber by using a hole in a cylinder block accommodating a push rod of an OHV type engine.
Figure 8:
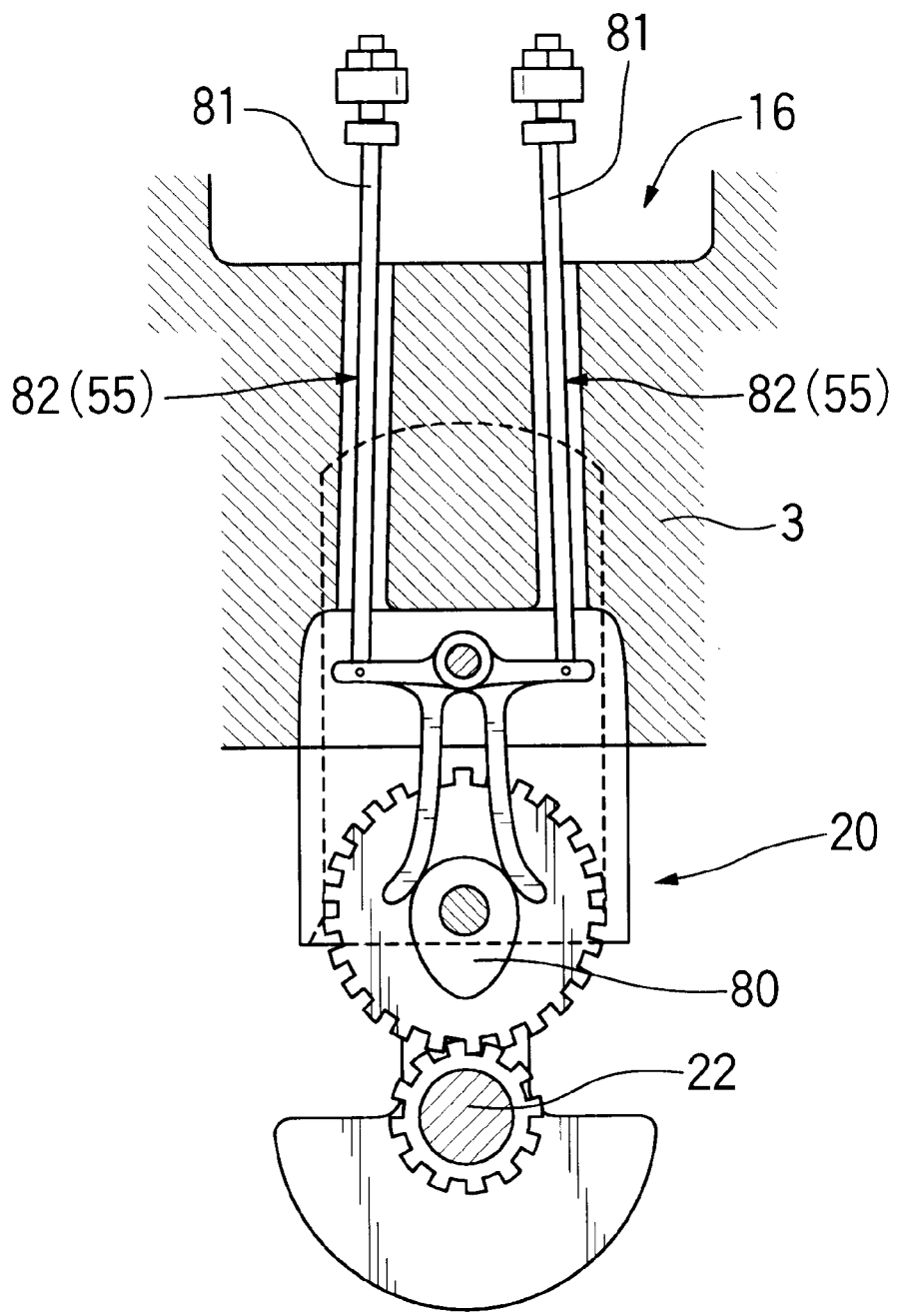
FIG. 8 is a schematic cross-sectional view, illustrating a construction for connecting a crank chamber to a valve chamber by using a hole in a cylinder block accommodating a push rod of an OHV type engine as in FIG. 7.

The engine 200 on the second embodiment and/or the engine 300 of the third embodiment may be an OHC type engine as in the engine 100 of the first embodiment, and may be an OHV type engine. In case the engine 200 and/or 300 is an OHV type engine, a push rod 81 interposed between a cam 80 close to the crankshaft 22 and the rocker arm 18 in the valve chamber 16 may be accommodated within a through hole 82 vertically passing through the cylinder block 3, and the cylinder block inner through hole 82 may serve as the first communication passage 55 (FIG. 7 and FIG. 8). This may also be applied to the engine 100 of the first embodiment.

The through hole 82 is formed in the cylinder block 3. Thus, while the mixture in the crank chamber 20 moves to the valve chamber 16 through the through hole 82, the mixture may be heated by the heat released from the cylinder block 3 so as to vaporize the gasoline component in the mixture.

Figure 9:
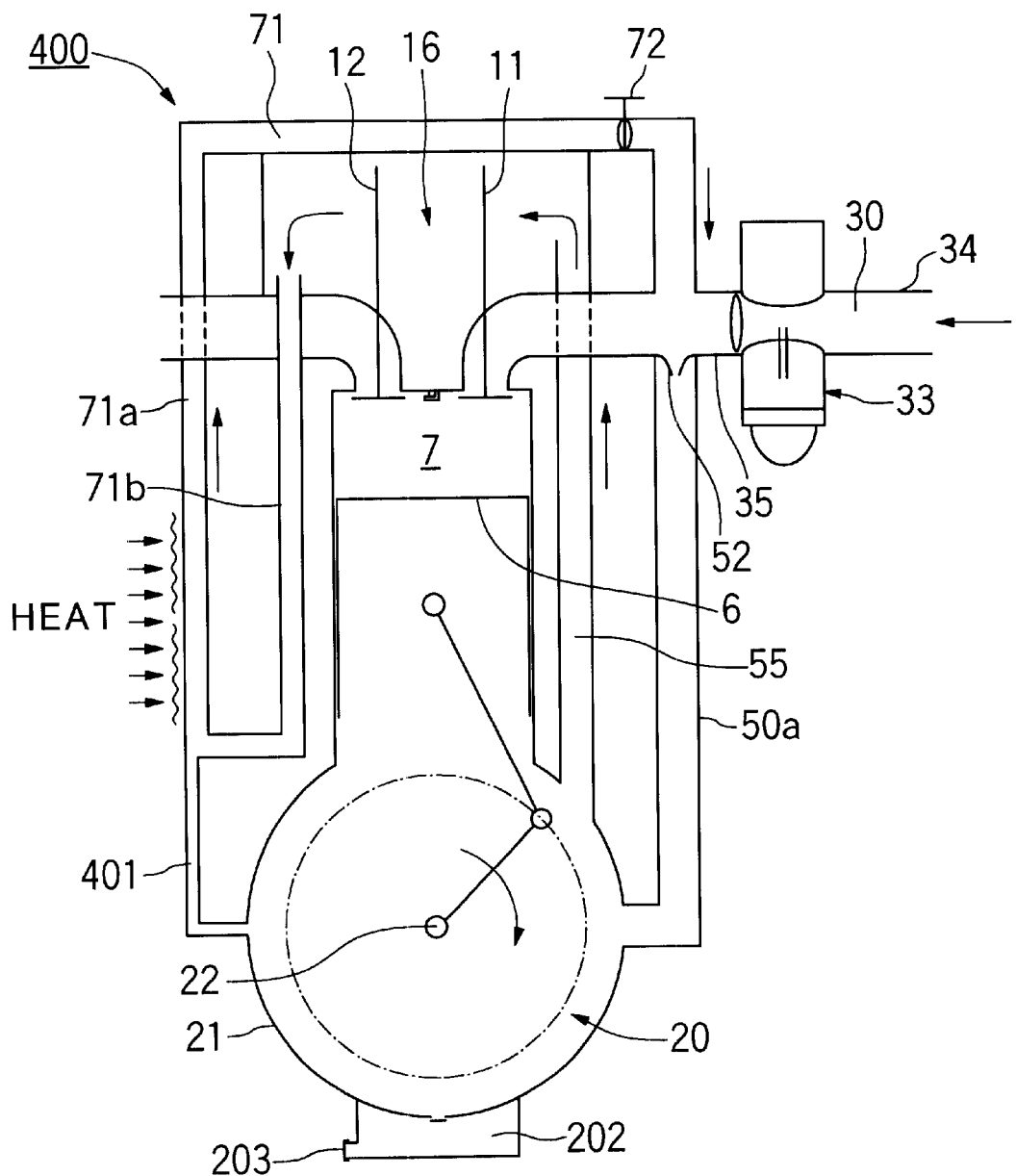
FIG. 9 is a schematic block diagram showing an engine of a fourth embodiment of the present invention.

Fourth Embodiment (FIG. 9)

In the engine 400, the crank chamber 20 and the valve chamber 16 are in fluid communication with each other through a branch intake passage 50a branched from the intake passage 30, and the valve chamber 16 and the intake passage 30 are in fluid communication with each other through a long circulating passage 71, so that the mixture circulated to the intake passage 30 may be heated by the circulating passage 71 to vaporize the gasoline component in the mixture.

An oil return passage 401 communicated with the crank chamber 20 is preferably provided to the long circular passage 71. The oil return passage 401 is preferably opened, for example, to a lower edge of the vertical portion 71a of the long circular passage 71 or a lowest portion of the long circular passage 71.

The long circular passage 71 may, for example, have an upstream portion formed in the cylinder block 3 and a vertical portion configured with an exterior pipe whose lower edge is coupled to the downstream intake pipe 35.

Figure 10:
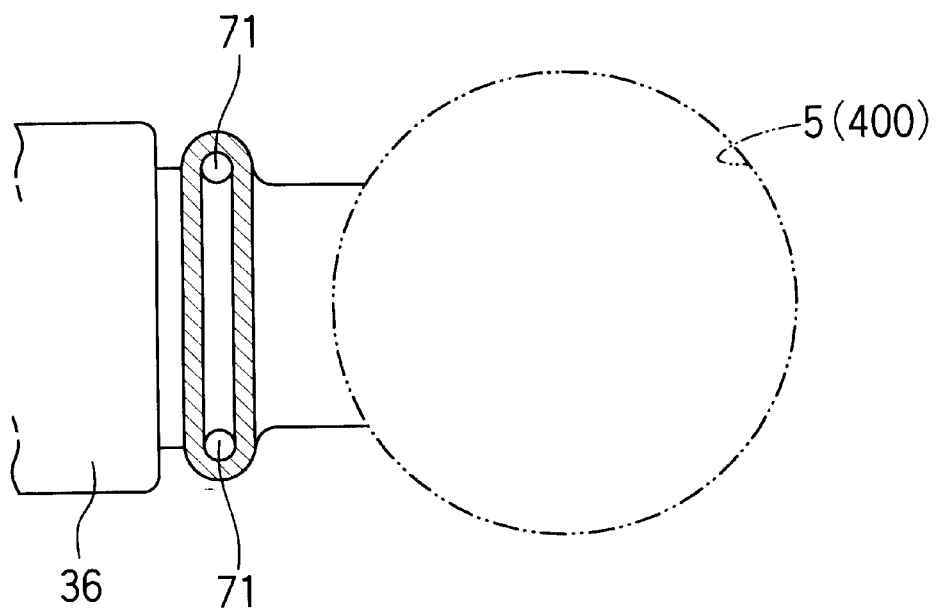
FIG. 10 a schematic diagram illustrating a specific construction for heating a mixture by use of the heat of an exhaust gas at some position in a series of paths through which the mixture introduced into a crank chamber is returned to an intake passage through a valve chamber.

The cylinder block 3 heat and/or exhaust gas heat of the engine 400 may be used as heat sources for heating the mixture passing through the circulating passage 71 to vaporize the gasoline component of the mixture. FIG. 10 shows an example in which the circulating passage 71 is formed around the exhaust port 10 or the exhaust pipe.

In the engine 400, the first communication passage 55 which allows fluid communication between crank chamber 20 and the valve chamber 16 may also be configured with the through hole 57 in the cylinder block to vaporize the gasoline component of the mixture by heating the heat released from the cylinder block 3 while the mixture moves from the crank chamber 20 to the valve chamber 16.

The engine 400 shown in the drawings has been exemplified as an OHC type engine, but may be an OHV type engine and may be a certain type of engine as described in conjunction with FIG. 6, in which the intake system device 31 is directly coupled to the crankcase 21.

The invention has now been explained with reference to specific embodiments. Other embodiments will be apparent to those of ordinary skill in the art. Therefore, it is not intended that the invention be limited, except as indicated by the appended claims, which form a part of this invention description.

What is claimed is:

1. A four-stroke cycle internal combustion engine whose inside is lubricated using a mixed fuel with a lubricant added thereto, said four-stroke cycle internal combustion engine comprising:

a crankshaft;

a crank chamber for accommodating said crankshaft;

a cylinder block;

a cylinder head;

a valve chamber provided in said cylinder head;

a combustion chamber; and a path extending from a point at which said mixed fuel is introduced into said engine to a point before charging said mixed fuel into said combustion chamber, whereby a fuel component included in said mixed fuel is vaporized by heating it in said path utilizing heat released from said engine;

wherein said path includes a first communicating passage which is in communication with said crank chamber and said valve chamber, said first communicating passage being formed in said cylinder block, wherein said engine is adapted to vaporize said fuel component included in said mixed fuel by heating said mixed fuel passing through said first communicating passage with heat released from said cylinder block.

2. A four-stroke cycle internal combustion engine as recited in claim 1, further including a second communicating pssage which is in communication with said valve chamber and said crank chamber and for returning the lubrication oil in said valve chamber to said crank chamber.

3. A four-stroke cycle internal combustion engine as recited in any one of claims 1 or 2, further comprising an intake port which opens toward said combustion chamber, an intake passage in communication with said intake port, a fuel supply device for supplying said mixed fuel to said intake port, a downstream intake passage located on a downstream side with respect to said fuel supply device provided in said intake passage, and a branch intake passage which is branched from said downstream intake passage and in communication with said crank chamber.

4. A four-stroke cycle internal combustion engine as recited in any one of claims 1 or 2, further comprising an intake passage directly connected to said crank chamber; and a fuel supply device for supplying said mixed fuel to said intake passage.

* * * * *